(12) United States Patent
Nonaka (10) Patent No.: US 11,101,503 B2
(45) Date of Patent: Aug. 24, 2021

(54) NONAQUEOUS ELECTROLYTE SECONDARY BATTERY AND METHOD OF MANUFACTURING NONAQUEOUS ELECTROLYTE SECONDARY BATTERY

(71) Applicant: SANYO Electric Co., Ltd., Daito (JP)

(72) Inventor: Taiki Nonaka, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 79 days.

(21) Appl. No.: 16/269,927

(22) Filed: Feb. 7, 2019

(65) Prior Publication Data

US 2019/0305379 A1 Oct. 3, 2019

(30) Foreign Application Priority Data

Mar. 30, 2018 (JP) .............................. JP2018-069938

(51) Int. Cl.
*H01M 10/0587* (2010.01)
(52) U.S. Cl.
CPC ................................ *H01M 10/0587* (2013.01)
(58) Field of Classification Search
CPC .................................................. H01M 10/0587
See application file for complete search history.

(56) References Cited

U.S. PATENT DOCUMENTS

| 2007/0166605 A1 | 7/2007 | Meguro et al. |
| 2009/0169979 A1* | 7/2009 | Ohashi ............... H01M 10/0587 429/94 |
| 2011/0094636 A1 | 4/2011 | Takeda et al. |
| 2016/0293928 A1* | 10/2016 | Wakimoto ............ H01M 2/024 |
| 2018/0159136 A1* | 6/2018 | Shiozaki ............... H01M 4/661 |

FOREIGN PATENT DOCUMENTS

| JP | 2006-278266 A | 10/2006 |
| JP | 2007-214106 A | 8/2007 |
| JP | 2011-89173 A | 5/2011 |
| WO | WO-2017038010 A1 * | 3/2017 ............ H01M 4/661 |

\* cited by examiner

*Primary Examiner* — Milton I Cano
*Assistant Examiner* — Jenna Shulman
(74) *Attorney, Agent, or Firm* — Westerman, Hattori, Daniels & Adrian, LLP (57) ABSTRACT

A nonaqueous electrolyte secondary battery that is an example of an embodiment includes a flat electrode body that has a winding structure in which a positive electrode and a negative electrode are wound with a separator interposed in between, in which flat portions and bend portions are formed in the flat electrode body. A negative electrode mixture layer is provided in the negative electrode to a winding outer end thereof. The negative electrode includes an extension portion that extends out from a winding outer end of the positive electrode towards a winding direction outer side. A length L of the extension portion in a winding direction satisfies a condition $L/((a-b)\times 2+b\pi)>0.135$, where a is a width of the electrode body and b is a thickness of the electrode body.

10 Claims, 7 Drawing Sheets

NONAQUEOUS ELECTROLYTE SECONDARY BATTERY AND METHOD OF MANUFACTURING NONAQUEOUS ELECTROLYTE SECONDARY BATTERY

CROSS REFERENCE TO RELATED APPLICATIONS

The present invention application claims priority to Japanese Patent Application No. 2018-069938 filed in the Japan Patent Office on Mar. 30, 2018, the entire contents of which are incorporated herein by reference.

BACKGROUND OF THE INVENTION

Field of the Invention

The present disclosure relates to a nonaqueous electrolyte secondary battery and a method of manufacturing the nonaqueous electrolyte secondary battery.

Description of Related Art

Hitherto, a nonaqueous electrolyte secondary battery including a flat electrode body in which a positive electrode and a negative electrode are wound with a separator interposed in between is not (see Japanese Published Unexamined Patent Application No. 2006-278266 (Patent Document 1) and Japanese Published Unexamined Patent Application No. 2007-214106 (Patent Document 2), for example). The flat electrode body is manufactured, for example, by manufacturing a cylindrical wound body using a substantially cylindrical core and by pressing the wound body in a radial direction after removing the core.

The wound body is manufactured by winding a positive electrode long member and a negative electrode long member around the core with a separator long member interposed in between.

BRIEF SUMMARY OF THE INVENTION

Incidentally, the inventors have found as a result of an investigation that in a nonaqueous electrolyte secondary battery including a flat wound electrode body, micro short-circuiting occurs due to a conductive foreign substance entering a winding-end lateral end portion of the electrode body and due to the foreign substance tearing through the separator. An object of the present disclosure is to suppress such micro short-circuiting from occurring.

A nonaqueous electrolyte secondary battery that is an aspect of the present disclosure includes a flat electrode body that has a winding structure in which a positive electrode and a negative electrode are wound with a separator interposed in between, wherein flat portions and bend portions are formed in the flat electrode body, and a negative electrode mixture layer provided in the negative electrode to a winding outer end thereof. In the nonaqueous electrolyte secondary battery, the negative electrode includes an extension portion that extends out from a winding outer end of the positive electrode towards a winding direction outer side, a length L of the extension portion in a winding direction satisfies a condition $L/((a-b)\times2+b\pi)>0.135$, where a is a width of the electrode body and b is a thickness of the electrode body.

A nonaqueous electrolyte secondary battery that is another aspect of the present disclosure includes a flat electrode body that has a winding structure in which a positive electrode and a negative electrode are wound with a separator interposed in between, wherein flat portions and bend portions are formed in the flat electrode body, and a negative electrode mixture layer provided in the negative electrode to a winding outer end thereof. In the nonaqueous electrolyte secondary battery, an insulating layer is provided at a winding-end lateral end portion of the positive electrode, the negative electrode includes an extension portion that extends out from a winding direction inner end of the insulating layer towards a winding direction outer side, and a length L of the extension portion in a winding direction satisfies a condition $L/((a-b)\times2+b\pi)>0.135$, where a is a width of the electrode body and b is a thickness of the electrode body.

A method of manufacturing a nonaqueous electrolyte secondary battery that is an aspect of the present disclosure includes fabricating a wound body so that an extension portion that extends from a winding outer end of the positive electrode towards a winding direction outer side is formed in the negative electrode by winding a positive electrode long member and a negative electrode long member around a core with a separator long member interposed in between and by cutting the positive electrode long member and the negative electrode long member after winding a predetermined length, and forming the extension portion so that a length L of the extension portion in a winding direction satisfies a condition $L/((a-b)\times2+b\pi)>0.135$, where a is a width of the electrode body and b is a thickness of the electrode body.

A method of manufacturing a nonaqueous electrolyte secondary battery that is another aspect of the present disclosure in which the nonaqueous electrolyte secondary battery includes a flat electrode body that has a winding structure in which a positive electrode and a negative electrode are wound with a separator interposed in between, in which flat portions and bend portions are formed in the flat electrode body, and a negative electrode mixture layer provided in the negative electrode to a winding outer end thereof, the method of manufacturing the nonaqueous electrolyte secondary battery including fabricating a wound body by winding a positive electrode long member and a negative electrode long member around a core with a separator long member interposed in between and by cutting the positive electrode long member and the negative electrode long member after winding a predetermined length, in which an insulating layer is provided at a winding-end lateral end portion of the positive electrode, and in which the negative electrode includes an extension portion that extends out from a winding direction inner end of the insulating layer towards a winding direction outer side; and forming the extension portion so that a length L of the extension portion in a winding direction satisfies a condition $L/((a-b)\times2+b\pi)>0.135$, where a is a width of the electrode body and b is a thickness of the electrode body.

The nonaqueous electrolyte secondary battery that is an aspect of the present disclosure is capable of suppressing micro short-circuiting, which may occur due to a conductive foreign substance entering a winding-end lateral end portion of an electrode body.

DETAILED DESCRIPTION OF THE INVENTION

As described above, in the nonaqueous electrolyte secondary battery including the flat wound electrode body, there are cases in which the positive electrode and the negative electrode become electrically coupled to each other due to a conductive foreign substance entering the winding-end lateral end portion of the electrode body and due to the foreign substance tearing through the separator. As a result of an investigation, the inventors have found that the conductive foreign substance that enters the winding-end lateral end portion of the electrode body is a portion of the negative electrode mixture layer that has fallen off from the negative electrode core body. The portion of the negative electrode mixture layer, which may become a cause of micro short-circuiting, is considered to fall off during the winding process of the electrode body when the negative electrode long member is cut. The inventors have found that by providing a configuration that satisfies a condition $L/((a-b) \times 2 + b\pi) > 0.135$, where a is a width of the electrode body, b is a thickness of the electrode body, and L is a length of the extension portion of the negative electrode described above, the micro short-circuiting that may occur due to the conductive foreign substance (a portion of the negative electrode mixture layer) can be highly suppressed. Hereinafter, referring to the drawings, an example of an embodiment of the present disclosure will be described in detail.

FIGS. 1A to 2C illustrate, as an example of an embodiment, a nonaqueous electrolyte secondary battery 10 that is a square battery including a square battery case. However, the nonaqueous electrolyte secondary battery according to the present disclosure may be, for example, a laminated battery including an outer package formed of a laminate sheet including, for example, a metal layer and a resin layer. Note that each of the drawings referred to while describing the embodiment is depicted in a schematic manner.

Figure 1A:
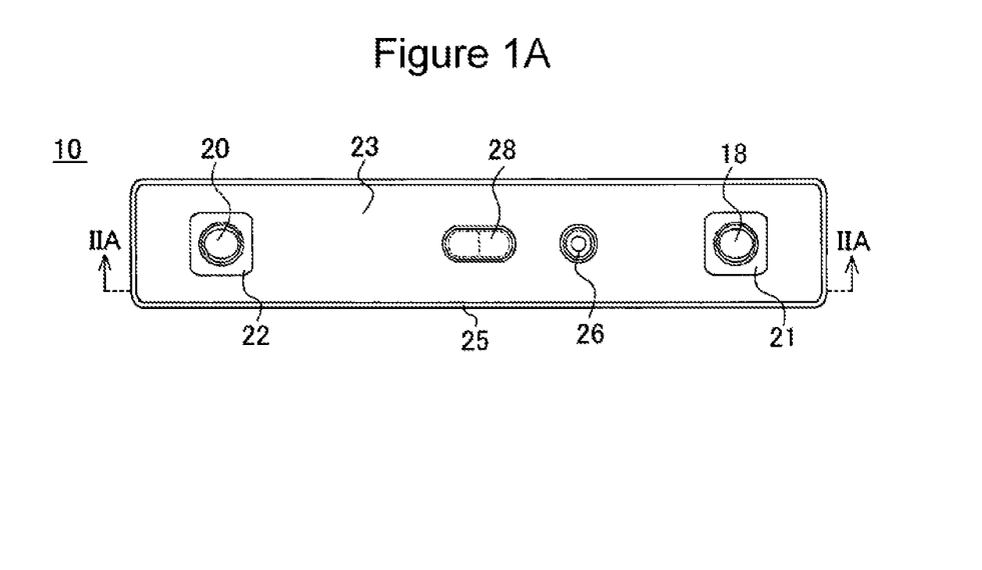
FIG. 1A is a plan view of a nonaqueous electrolyte secondary battery that is an example of an embodiment.
Figure 1B:
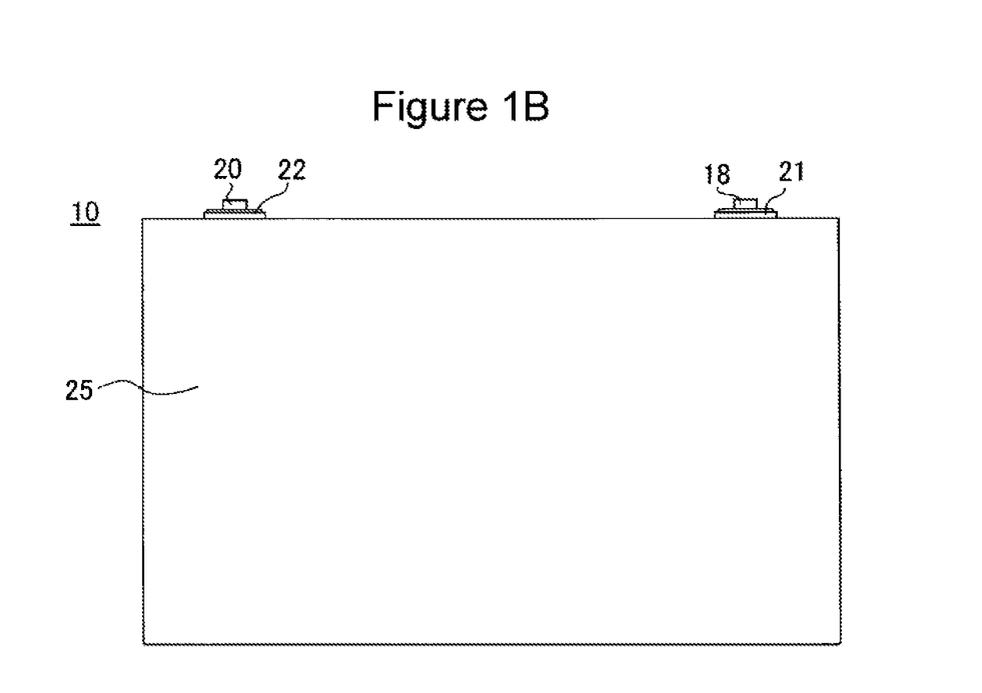
FIG. 1B is a front view of the nonaqueous electrolyte secondary battery that is the example of the embodiment.

FIG. 1A is a plan view of the nonaqueous electrolyte secondary battery 10, and FIG. 1B is a front view of the nonaqueous electrolyte secondary battery 10. As exemplified in FIGS. 1A and 1B, the nonaqueous electrolyte secondary battery 10 includes a square tubular outer can 25 having a bottom, and a sealing plate 23 that seals an opening of the outer can 25. The outer can 25 and the sealing plate 23 constitute the battery case. The sealing plate 23 has a substantially rectangular shape in plan view. A positive electrode terminal 18 is provided on a first end side of the sealing plate 23 in a longitudinal direction with an insulation member 21 in between, and a negative electrode terminal 20 is provided on a second end side in the longitudinal direction with an insulation member 22 in between. Furthermore, an electrolyte injection hole is provided in the sealing plate 23, and the electrolyte injection hole is sealed with a sealing member 26. Furthermore, the sealing plate 23 is provided with a gas release valve 28 that becomes fractured when a pressure inside the battery case becomes equivalent to or higher than a predetermined value.

Figure 2A:
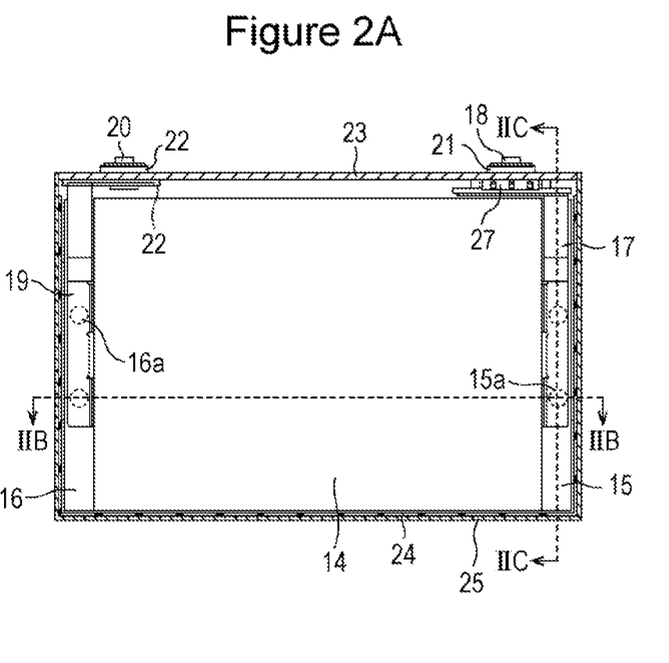
FIG. 2A is a cross-sectional view taken along line IIA-IIA in FIG. 1A.
Figure 2B:
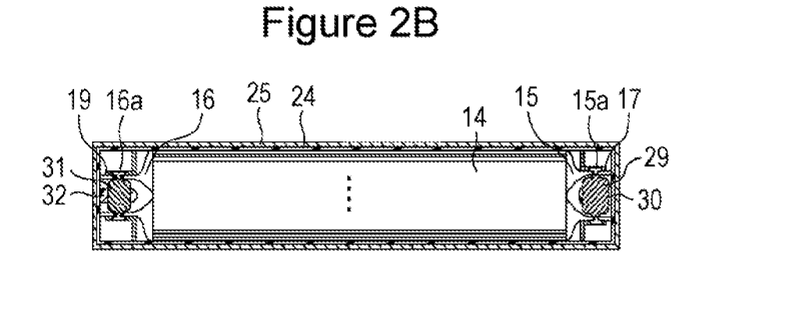
FIG. 2B is a cross-sectional view taken along line IIB-IIB in FIG. 2A.
Figure 2C:
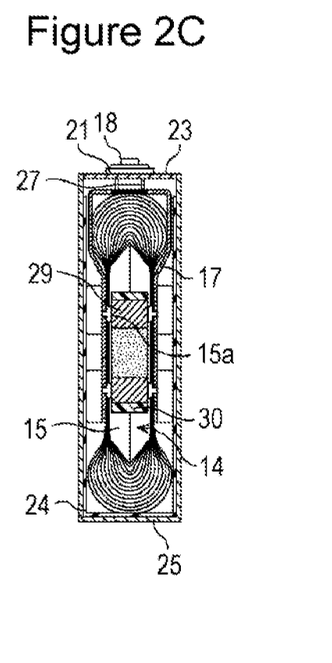
FIG. 2C is a cross-sectional view taken along line IIC-IIC in FIG. 2A.

FIGS. 2A to 2C are cross-sectional views of the nonaqueous electrolyte secondary battery 10. As exemplified in FIGS. 2A to 2C, the nonaqueous electrolyte secondary battery 10 includes a flat electrode body 14 housed in the outer can 25 and nonaqueous electrolyte (not shown). In the present embodiment, while the electrode body 14 is housed inside the battery case so that a winding axis direction of the electrode body 14 extends in the longitudinal direction of the battery case, the electrode body 14 may be disposed so that the winding axis direction of the electrode body 14 and the longitudinal direction of the battery case are orthogonal to each other.

The nonaqueous electrolyte contains a nonaqueous solvent and electrolyte salt dissolved in the nonaqueous solvent. For example, ester, ether, nitrile, amides, or a mixed solvent containing two or more of the above may be used as the nonaqueous solvent. The nonaqueous solvent may contain a halogen-substituted compound in which at least some of the hydrogens of the solvent are substituted with halogen atoms. Note that the nonaqueous electrolyte is not limited to liquid electrolyte and may be solid electrolyte in which gelatinous polymer or the like is used. Lithium salt such as $LiPF_6$ is used as the electrolyte salt.

The electrode body 14 has a winding structure in which a belt-shaped positive electrode 11 and a belt-shaped negative electrode 12 are wound with a belt-shaped separator 13 interposed therebetween (see FIGS. 3A, 3B, and 4 described later). Furthermore, the electrode body 14 includes a positive electrode core body exposed portion 15 formed in a first end portion in the winding axis direction, and a negative electrode core body exposed portion 16 formed in a second end portion in the winding axis direction. An insulation sheet 24 is disposed between the electrode body 14 and the outer can 25 so as to wrap the electrode body 14.

In the present embodiment, the positive electrode core body exposed portion 15 is layered at the first end portion of the electrode body 14 in the winding axis direction, and the layered portion is electrically coupled to the positive electrode terminal 18 with a positive electrode current collector plate 17 interposed therebetween. A current breaking mechanism 27 is provided in a conductive path between the positive electrode core body exposed portion 15 and the positive electrode terminal 18. Furthermore, the negative electrode core body exposed portion 16 is layered at the second end portion of the electrode body 14 in the winding axis direction, and the layered portion is electrically coupled to the negative electrode terminal 20 with a negative electrode current collector plate 19 interposed therebetween. For example, the layered portion of the positive electrode core body exposed portion 15 is divided into two, and a resin positive electrode intermediate member 30 holding a metal positive electrode conductive member 29 is disposed therebetween. Similarly, the negative electrode core body exposed portion 16 is divided into two, and a resin negative electrode intermediate member 32 holding a metal negative electrode conductive member 31 is disposed therebetween.

The positive electrode current collector plate 17 is disposed on an outer surface of the positive electrode core body exposed portion 15 so as to hold the layered portion of the positive electrode core body exposed portion 15 in between. Similarly, the negative electrode current collector plate 19 is disposed on an outer surface of the negative electrode core body exposed portion 16 so as to hold the layered portion of the negative electrode core body exposed portion 16 in between. The current collector plates, the exposed portions, and the conductive members are connected to each other by, for example, resistance welding and form welded portions 15a and 16a. Note that the shapes of the core body exposed portions, the current political structures of the electrode bodies, and the like are not limited in particular.

Figure 6:
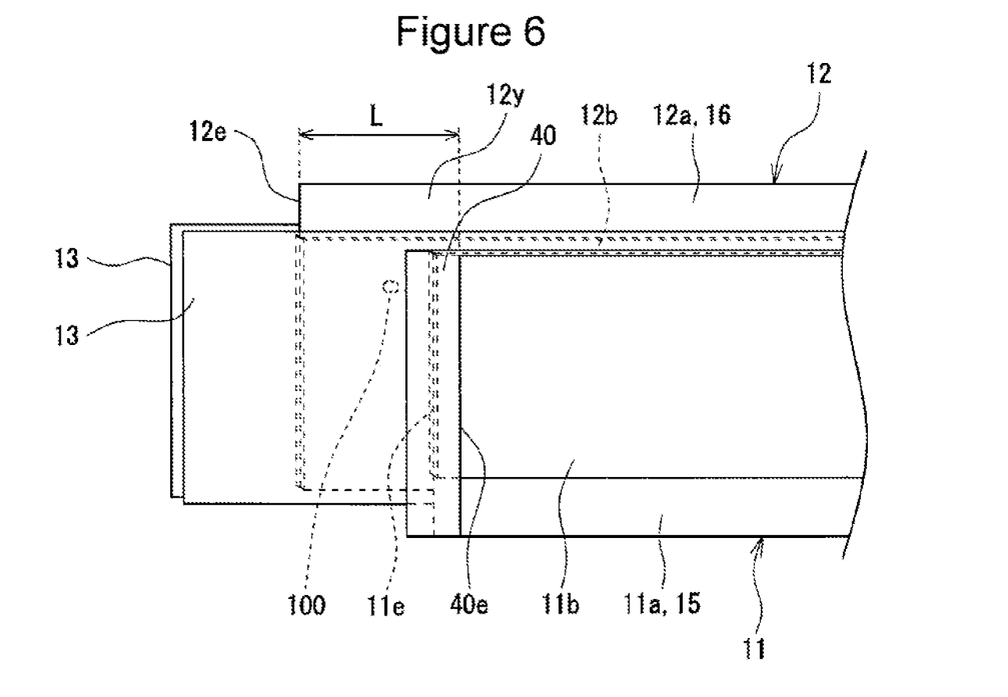
FIG. 6 is a drawing illustrating a winding-end lateral end portion of the electrode body that is another example of the embodiment.
Figure 7:
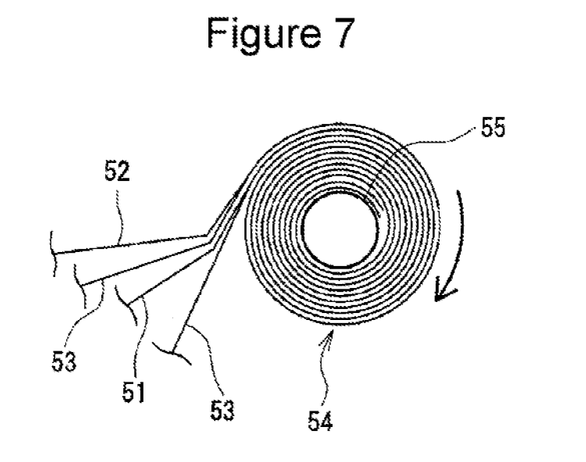
FIG. 7 is a drawing to illustrate a method of manufacturing the electrode body, which is an example of the embodiment.
Figure 8:
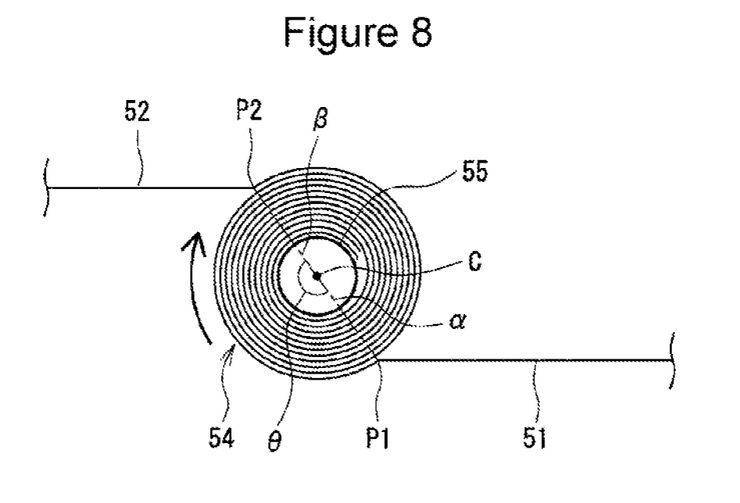
FIG. 8 is a drawing to illustrate a method of manufacturing the electrode body, which is an example of the embodiment.

Hereinafter, referring to FIGS. 3A to 8, the electrode body 14 will be described in detail. FIG. 3A is a front view of the positive electrode 11, FIG. 3B is a front view of the negative electrode 12, and FIG. 4 is a side view of the electrode body 14. FIGS. 5 and 6 are diagrams illustrating winding-end lateral end portions (winding outer ends 11e and 12e) of the electrode body 14, and are figures in which the winding-end lateral end portions have been developed. FIGS. 7 and 8 are diagrams illustrating a winding method of the electrode body 14. Note that in order to illustrate the diagrams in a clear manner, illustration of the separator 13 is omitted in FIGS. 4 and 8.

Figure 3A:
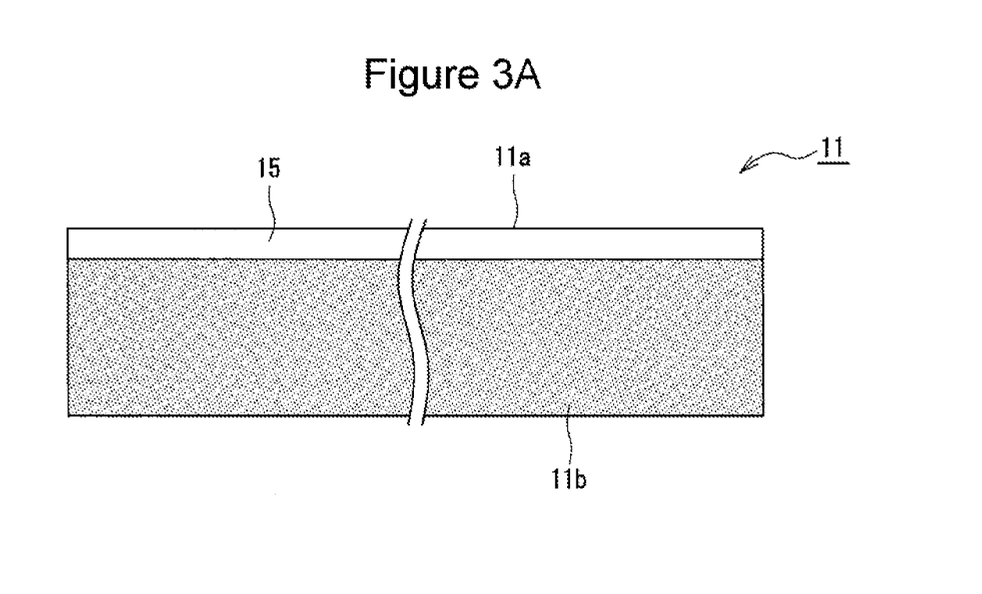
FIG. 3A is a front view of a positive electrode that is an example of the embodiment.

As illustrated in the example in FIG. 3A, the positive electrode 11 includes a positive electrode core body 11a, and a positive electrode mixture layer 11b provided on the positive electrode core body 11a. A film formed of metal, which is stable in the potential range of the positive electrode 11, such as aluminum or an aluminum alloy, or a film or the like in which the above metal is disposed on the surface thereof can be used as the positive electrode core body 11a. A thickness of the positive electrode core body 11a is, for example, 10 to 20 µm. Desirably, the positive electrode mixture layer 11b contains a positive electrode active material, a conductive material such acetylene black, and a binding material such as polyvinylidene fluoride (PVdF) and is provided on both surfaces of the positive electrode core body 11a. A total thickness of the positive electrode mixture layer 11b on both sides of the positive electrode core body 11a is, for example, 50 to 200 µm. The positive electrode 11 can be fabricated by forming the positive electrode mixture layer 11b on both sides of the positive electrode core body 11a by coating a positive electrode mixture slurry containing the positive electrode active material, the conductive material, the binding material, and the like on the positive electrode core body 11a and compressing the coating film after drying the coating film.

For example, lithium composite metal oxide is used in the positive electrode active material. A metallic element contained in the lithium composite metal oxide includes Ni, Co, Mn, Al, B, Mg, Ti, V, Cr, Fe, Cu, Zn, Ga, Sr, Zr, Nb, In, Sn, Ta, and W. An example of a desirable lithium composite metal oxide is a lithium composite metal oxide containing at least one of Ni, Co, and Mn. For example, the desirable lithium composite metal oxide includes a lithium composite metal oxide containing Ni, Co, and Mn, a lithium composite metal oxide containing Ni, Co, and Al, and the like. Note that particles of inorganic compounds such as tungsten oxide, alumina, and a lanthanoid containing compound may be fixed to the particle surfaces of the lithium composite metal oxide.

Figure 3B:
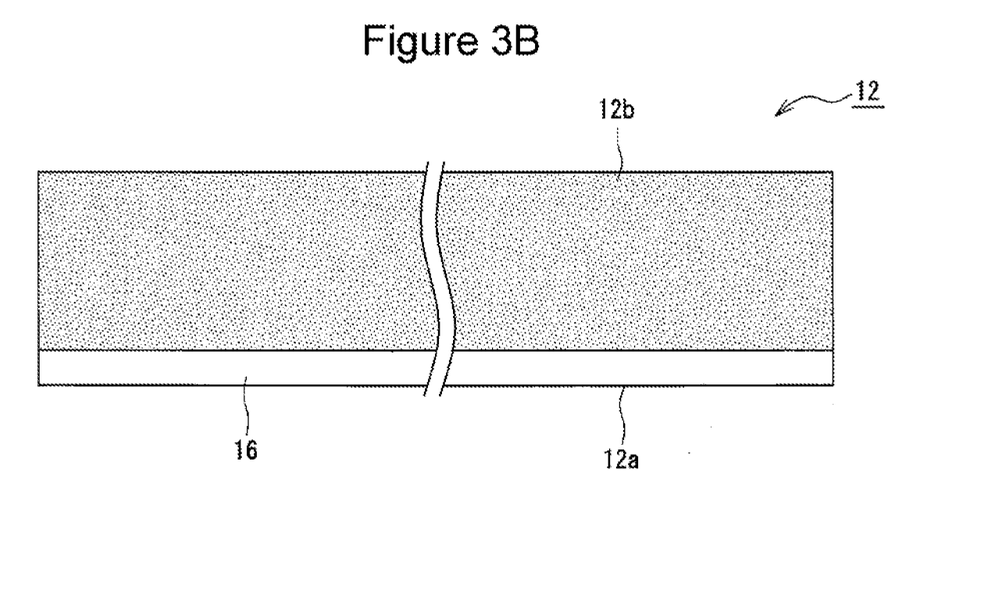
FIG. 3B is a front view of a negative electrode that is an example of the embodiment.

As illustrated in the example in FIG. 3B, the negative electrode 12 includes a negative electrode core body 12a, and a negative electrode mixture layer 12b provided on the negative electrode core body 12a. A metal film, which is stable in the potential range of the negative electrode 12, such as copper or a copper alloy, or a film or the like in which the above metal is disposed on the surface thereof can be used as the negative electrode core body 12a. A thickness of the negative electrode core body 12a is, for example, 5 to 15 µm. Desirably, the negative electrode mixture layer 12b contains a negative electrode active material, and a binding material such as styrene-butadiene rubber (SBR), carboxymethyl cellulose (CMC), or a salt thereof and is provided on both surfaces of the negative electrode core body 12a. A total thickness of the negative electrode mixture layer 12b on both sides of the negative electrode core body 12a is, for example, 50 to 200 µm. The negative electrode 12 can be fabricated by forming the negative electrode mixture layer 12b on both sides of the negative electrode core body 12a by coating a negative electrode mixture slurry containing the negative electrode active material, the binding material, and the like on the negative electrode core body 12a and compressing the coating film after drying the coating film.

For example, graphite (natural graphite or artificial graphite), mesophase-pitch-based carbon fiber (MCF), mesocarbon microbeads (MCMB), coke, hard carbon, or the like is used in the negative electrode active material. Metal, such as Si or Sn, that becomes an alloy with lithium, an alloy containing the above metal, or a compound containing the above metal may be used in the negative electrode active material, and the above may be used together with graphite. A specific example of the compound includes a silicon compound expressed by $SiO_x$ ($0.5 \leq x \leq 1.6$).

Figure 4:
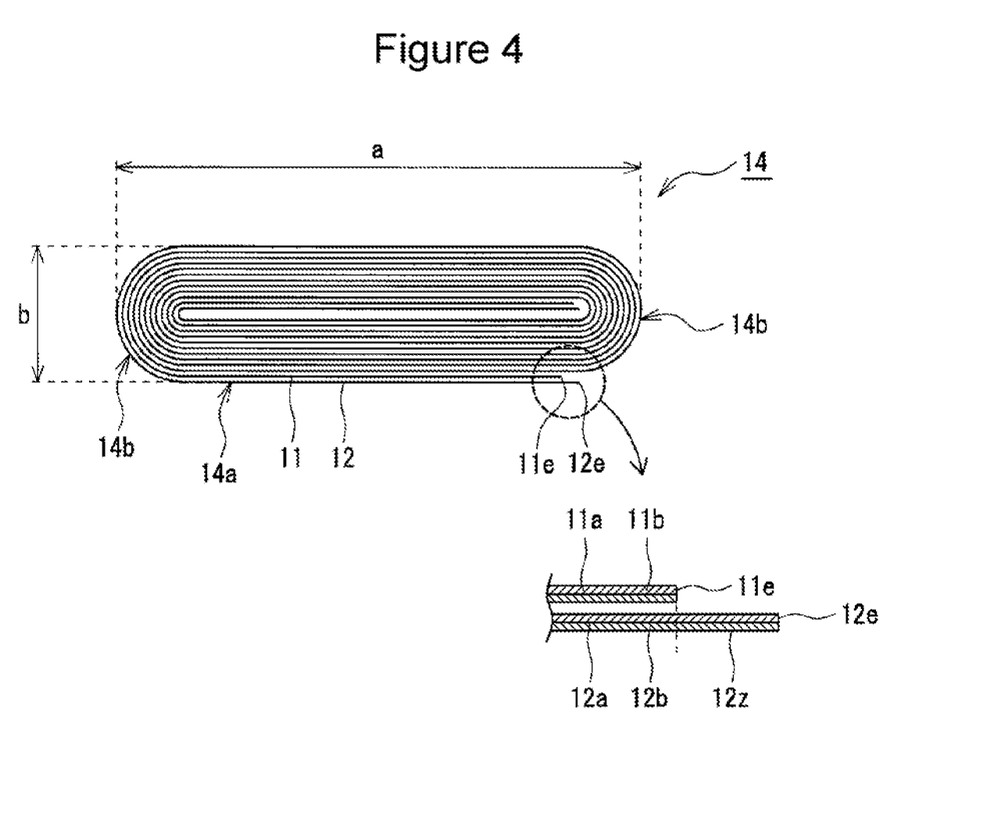
FIG. 4 is a side view of an electrode body that is an example of the embodiment.
Figure 5:
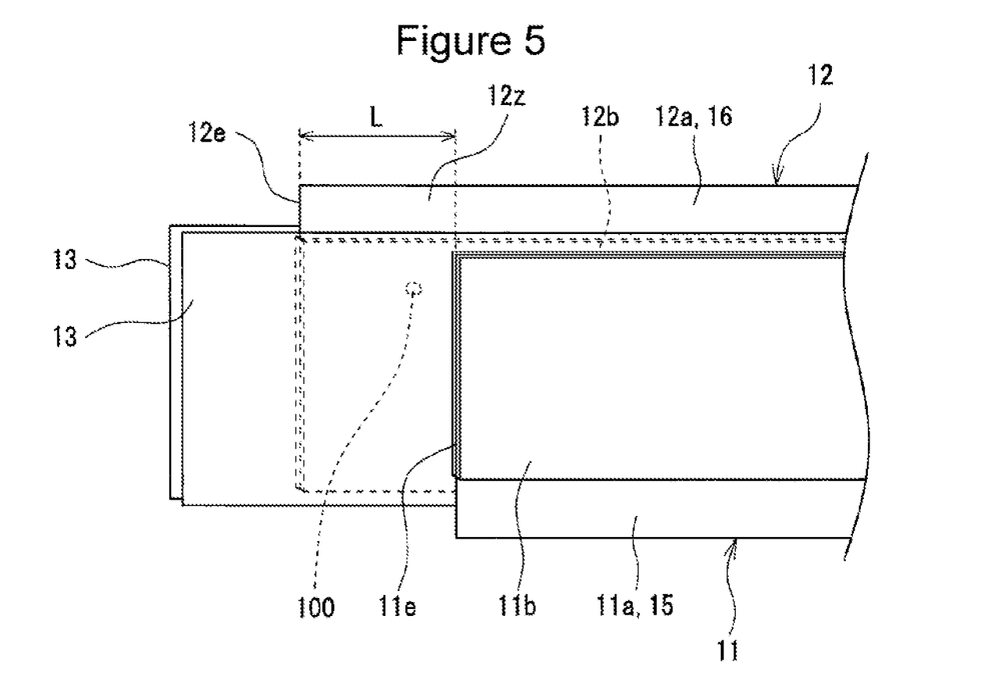
FIG. 5 is a drawing illustrating a winding-end lateral end portion of the electrode body that is an example of the embodiment.

As illustrated in the examples in FIGS. 4 and 5, the electrode body 14 has a flat shape in which the positive electrode 11 and the negative electrode 12 are wound in a spiral manner with the separator 13 interposed therebetween, and in which flat portions 14a and bend portions 14b are formed. The electrode body 14 is desirably manufactured by press-forming a wound body in which the positive electrode 11 and the negative electrode 12 are wound with the separator 13 interposed therebetween. The flat portions 14a are portions of the electrode body 14 in which the outer surface is substantially planer. The bend portions 14b are portions of the electrode body 14 in which the outer surface is curved so as to protrude towards the outer side. In each of the bend portions 14b, the positive electrode 11 and the negative electrode 12 are curved so as to protrude towards the outer side. The bend portions 14b are formed on both sides of the flat portions 14a.

A length of the electrode body 14 in the winding axis direction is preferably 50 to 150 mm. A width a of the electrode body 14 is preferably 50 to 150 mm, and more preferably 70 to 90 mm. A thickness b of the electrode body 14 is preferably 10 to 30 mm, and more preferably is 20 to 25 mm. Note that the width a of the electrode body 14 is a length from a tip of one bend portion 14b to a tip of the other bend portion 14b, which is a length in a direction orthogonal to the winding axis direction and a thickness direction. Furthermore, the thickness b of the electrode body 14 is a length from the outermost surface of one flat portion 14a to the outermost surface of the other flat portion 14a, which is a length in a direction orthogonal to the winding axis direction and a width direction.

The electrode body 14 has a structure in which the positive electrode 11 and the negative electrode 12 are wound with the separator 13 interposed therebetween so that the positive electrode core body exposed portion 15 and the negative electrode core body exposed portion 16 are positioned on opposite sides in the winding axis direction. A porous sheet having ion permeability and insulation properties is used in the separator 13. Specific examples of the porous sheet include a microporous thin film, woven fabric, nonwoven fabric, and the like. The material of the separator 13 is, desirably, an olefin resin such as polyethylene or polypropylene, cellulose, or the like. The separator 13 may either have a single layer structure or a layered structure, and a sheet-resistant layer may be formed on the surface of the separator 13.

In order to suppress deposition of lithium, the negative electrode 12 is a size larger than the positive electrode 11 so that the negative electrode mixture layer 12b is always present in the area opposing the positive electrode mixture layer 11b. In the present embodiment, the positive electrode mixture layer 11b is provided on both surfaces of the positive electrode core body 11a from a winding outer end 11e to a winding inner end of the positive electrode 11, in other words, across both ends of the positive electrode 11 in the longitudinal direction. Similarly, the negative electrode mixture layer 12b is provided on both surfaces of the negative electrode core body 12a from a winding outer end 12e to a winding inner end of the negative electrode 12, in other words, across both ends of the negative electrode 12 in the longitudinal direction. Accordingly, the winding outer end 11e of the positive electrode 11 and the winding outer end of the positive electrode mixture layer 11b coincide with each other. Furthermore, the winding outer end 12e of the negative electrode 12 and the winding outer end of the negative electrode mixture layer 12b coincide with each other.

Note that while the negative electrode 12 can constitute a winding outer end of the electrode body 14, typically, as illustrated in the example in FIG. 5, the separator 13 extends out to the outer side in the winding direction exceeding the winding outer end 12e of the negative electrode 12. In other words, a winding outer end of the separator 13 is the winding outer end of the electrode body 14.

The negative electrode 12 includes an extension portion 12z that extends out towards the winding direction outer side with respect to the winding outer end 11e of the positive electrode 11. The extension portion 12z extends towards the winding direction outer side of the electrode body 14 with respect to a position opposing the winding outer end 11e of the positive electrode 11 with the separator 13 interposed therebetween. The extension portion 12z is a portion that does not oppose the positive electrode 11. By providing the extension portion 12z at the winding-end lateral end portion of the electrode body 14, the negative electrode mixture layer 12b is disposed so as to oppose the entire surface of the positive electrode mixture layer 11b even when the positive electrode 11 and the negative electrode 12 are slightly misaligned from the intended positions. Note that an extension portion (not shown) of the negative electrode 12 that extends out on the winding direction inner side with respect to the winding inner end of the positive electrode 11 is, desirably, provided at a winding-start lateral end portion of the electrode body 14 as well.

A length L of the extension portion 12z of the negative electrode 12 in the winding direction, in other words, a distance L between the winding outer end 11e of the positive electrode 11 and the winding outer end 12e of the negative electrode 12 satisfies the following condition, $$L/((a-b)\times 2 + b\pi) > 0.135,$$

where a is the width and b is the thickness of the electrode body 14. In the above case, even if a conductive foreign substance 100, which is a portion of the negative electrode mixture layer 12b that has fallen off, enters the winding-end lateral end portion of the electrode body 14, a micro short-circuiting caused by the conductive foreign substance 100 can be sufficiently suppressed from occurring. As a result of an investigation conducted by the inventors, it has been known that the probability of the conductive foreign substance 100 entering the portion where the positive electrode 11 and the negative electrode 12 oppose each other markedly decreases when the length L of the extension portion 12z satisfies the above condition (for details, see the investigation result described later).

As indicated by the condition described above, as the width a and the thickness b of the electrode body 14 become larger, the length L of the extension portion 12z needs to be longer. Although the application ranges of the width a and the thickness b are not limited to any ranges in particular, when, for example, the width a is 50 to 150 mm and the thickness b is 10 to 30 mm, the micro short-circuiting caused by the conductive foreign substance 100 can be suppressed in a particularly efficient manner. From the viewpoint of suppressing short-circuiting from occurring, the upper limit of the length L is not limited to any length; however, considering other performances such as the energy density of the battery, and the like, preferably, the condition $L/((a-b)\times 2 + b\pi) < 1.0$ is satisfied, and more preferably, the condition $L/((a-b)\times 2 + b\pi) < 0.5$ is satisfied.

The length L of the extension portion 12z is preferably 13.5% or more of the outermost circumferential length of the electrode body 14. Furthermore, the length L of the extension portion 12z is desirably shorter than the outermost circumferential length of the electrode body 14. An example of a preferable range of the length L is 13.5 to 100% of the outermost circumferential length of the electrode body 14 or is 13.5 to 50%.

An insulating layer can be provided at a winding-end lateral end portion of the positive electrode 11. By providing the insulating layer, falling off of a portion of the positive electrode mixture layer 11b from the positive electrode 11 can be suppressed. Note that the insulating layer is, desirably, a resin member coated on the positive electrode 11, or a piece of insulating tape adhered to the positive electrode 11. A resin base material and an adhesion layer provided on the resin base material may be used as the insulating tape. As the adhesion layer, desirably, an adhesion layer having an adhesive property at normal temperature or an adhesion layer exerting an adhesive property when heated or the like is used. Furthermore, the resin base material constituting the insulating tape may be heat welded to the positive electrode 11. Note that the insulating layer may be one that has lithium-ion impermeability.

As illustrated in the example in FIG. 6, as the insulating layer, a piece of insulating tape 40 can be provided at the winding-end lateral end portion of the positive electrode 11. The insulating tape 40 includes a resin base material and an adhesion layer provided on the resin base material. In the configuration illustrated in FIG. 6, the insulating tape 40 is adhered to both sides of the positive electrode 11. In other words, the winding-end lateral end portion of the positive electrode 11 is interposed between two insulating tapes 40. Furthermore, the insulating tapes 40 are disposed so as to cover the winding outer end 11e of the positive electrode 11 and to extend to the winding direction outer side with respect to the winding outer end 11e of the positive electrode 11. When the winding outer end 11e of the positive electrode 11 is covered by the insulating tapes 40, short-circuiting can be reliably prevented even when there is a burr at the end portion of the positive electrode core body 11a. In the configuration illustrated in FIG. 6, when the winding-end lateral end portion of the positive electrode 11 is viewed from above, winding direction inner ends 40e of the two insulating tapes 40 are situated at the same position. However, the winding direction inner ends 40e of the two insulating tapes 40 may be situated at different positions. Note that a single piece of insulating tape 40 may be adhered to both sides of the positive electrode 11 by folding back a single piece of insulating tape 40.

In a case in which the insulating tape 40 is provided, the length L from the winding direction inner end 40e of the insulating tape 40 to the winding outer end 12e of the negative electrode 12 in the winding direction becomes important since, even if there is the conductive foreign substance 100, no short-circuiting will occur at the portion where the tape is present.

In the example illustrated in FIG. 6, a portion in the negative electrode 12 extending out towards the winding direction outer side from the winding direction inner end 40e of the insulating tape 40 is referred to as an extension portion 12y. Furthermore, the length L of the extension portion 12y in the winding direction satisfies the condition $L/((a-b)\times2+b\pi)>0.135$. In such a case as well, similar to the configuration illustrated in FIG. 5, preferably, the condition $L/((a-b)\times2+b\pi)<1.0$ is satisfied and, more preferably, the condition $L/((a-b)\times2+b\pi)<0.5$ is satisfied.

As described above, the electrode body 14 is manufactured by pressing a wound body, in which the positive electrode 11 and the negative electrode 12 are wound with the separator 13 interposed therebetween, into a flat shape. In such a case, for example, a cylindrical wound body is manufactured using a substantially cylindrical core, and after removing the core, the wound body is pressed in a radial direction. Alternatively, a flat core may be used and the positive electrode 11 and the negative electrode 12 may be wound into a flat shape. In such a case as well, after removing the core, the positive electrode 11 and the negative electrode 12 are further pressed and formed into a flat shape. Note that the extension portion 12z is formed in the winding-end lateral end portion of the electrode body 14 by winding the negative electrode 12 and the positive electrode 11 while in a state in which one end of the negative electrode 12 in the longitudinal direction that is to become the winding outer end 12e is extended out from one end of the positive electrode 11 in the longitudinal direction that is to become the winding outer end 11e.

As in the examples illustrated in FIGS. 7 and 8, a wound body 54 is fabricated by winding a positive electrode long member 51 and a negative electrode long member 52 around a core 55 with a separator long member 53 interposed in between. In the above step, after winding a predetermined length, the positive electrode long member 51, the negative electrode long member 52, and the separator long member 53 are each cut to form the positive electrode 11, the negative electrode 12, and the separator 13 having predetermined lengths. Note that, desirably, cutting of the positive electrode long member 51, the negative electrode long member 52, and the separator long member 53 are each performed in the final phase of the winding step. For example, after a predetermined length of winding of the positive electrode long member 51, the negative electrode long member 52, and the separator long member 53, the positive electrode long member 51, the negative electrode long member 52, and the separator long member 53 are cut. Subsequently, the portions in the positive electrode long member 51, the negative electrode long member 52, and the separator long member 53 that has not been wound are wound and the winding step is completed. The positive electrode long member 51, the negative electrode long member 52, and the separator long member 53 may each be cut in the initial phase of the winding step. Furthermore, the positive electrode long member 51, the negative electrode long member 52, and the separator long member 53 may each be cut after the completion of the winding step. Alternatively, the positive electrode long member 51, the negative electrode long member 52, and the separator long member 53 may each be cut to a predetermined length before the winding step.

In the example illustrated in FIGS. 7 and 8, the substantially cylindrical core 55 is used to fabricate the substantially cylindrical wound body 54. In such a case, the electrode body 14 is manufactured by pressing the wound body 54 into a flat shape after removing the core 55 from the wound body 54.

As illustrated in the example in FIG. 7, the positive electrode long member 51, the negative electrode long member 52, and the separator long member 53 may be fed from the same direction with respect to the core 55. Furthermore, as illustrated in the example in FIG. 8, the positive electrode long member 51 and the negative electrode long member 52 may be fed from directions opposite to each other with respect to the core 55. In such a case, the conductive foreign substance 100 falling off from the winding outer end 12e that is a cut portion of the negative electrode long member 52 will not easily enter the portion where the positive electrode 11 and the negative electrode 12 oppose each other. Although the separator long member 53 is not illustrated in FIG. 8, the separator long member 53 is fed, for example, from the side that is the same as that of the positive electrode long member 51.

In a case in which the positive electrode long member 51 and the negative electrode long member 52 are fed from opposite sides of the core 55, it is desirable that an angle θ formed between an imaginary line α and an imaginary line β is adjusted within the range of 180°±30°. The angle θ may be 180° to feed the long members from exactly opposite sides of the core 55 in the radial direction. Note that the imaginary line α is a line that connects a point P1, which is where the positive electrode long member 51 abuts against in the core 55 or which is where the positive electrode long member 51 abuts against in a portion (the separator long member 53) that has already been wound, and a central axis C of the core 55 to each other and is an imaginary line that extends in the radial direction of the core 55. The imaginary line β is a line that connects point P2, which is where the negative electrode long member 52 abuts against in the core 55 or which is where the negative electrode long member 52 abuts against in a portion that has already been wound, and the central axis C of the core 55 to each other and is an imaginary line that extends in the radial direction of the core 55. In such a case, desirably, feed rollers (not shown) that are used in feeding the long members are moved so that the angle θ is maintained at a constant value from the winding start till the winding end.

As described above, the manufacturing process of the electrode body 14 includes a step of fabricating the wound body 54 in which the positive electrode long member 51 and the negative electrode long member 52 are wound around the core 55 with the separator long member 53 interposed in between so that the extension portion 12z, which extends out from the winding outer end 11e of the positive electrode 11 towards the winding direction outer side, is formed in the negative electrode 12, and in which the positive electrode long member 51 and the negative electrode long member 52 are cut after winding a predetermined length. In so doing, the extension portion 12z is formed so that the length L of the extension portion 12z in the winding direction satisfies the condition $L/((a-b)\times2+b\pi)>0.135$.

The inventors have found that, as described above, the conductive foreign substance 100 that enters the winding-end lateral end portion of the electrode body 14 is a portion of the negative electrode mixture layer 12b that have fallen off from the negative electrode core body 12a. Furthermore, based on the following investigation, the inventors have found $L/((a-b)\times2+b\pi)>0.135$ that is a condition for suppressing micro short-circuiting caused by the conductive foreign substance 100. The inventors fabricated about 150,000 test-cells and checked whether micro short-circuiting occurred. The electrode bodies of the test-cells (no good products) in which micro short-circuiting had been seen were disassembled and checks were conducted on whether there were any conductive foreign substance, which is a portion of the negative electrode mixture layer 12b that has fallen off from the negative electrode core body 12a, and on the position at which the conductive foreign substance was situated.

Fabrication of Positive Electrode

A positive electrode mixture slurry was prepared by mixing a complex oxide expressed by $LiNi_{0.35}Co_{0.35}Mn_{0.30}O_2$, acetylene black, and PVdF at a solid content mass ratio of 93.5:5:1.5 and by adding an optimum amount of N-methyl-2-pyrrolidone. The positive electrode long member on which the positive electrode mixture layer is formed on both surfaces of the positive electrode core body was fabricated by coating the slurry on both surfaces of a long positive electrode core body formed of aluminum foil, and by rolling the coating film with a roller after drying the coating film. In the positive electrode long member, a core body exposed portion having a substantially uniform width was provided at the first end portion of the core body in the width direction and the mixture layer was formed throughout the entire length in the longitudinal direction.

Fabrication of Negative Electrode

A negative electrode mixture slurry was prepared by mixing graphite, CMC, and SBR at a solid content mass ratio of 98:1:1 and by adding an optimum amount of water. The negative electrode long member on which the negative electrode mixture layer is formed on both surfaces of the negative electrode core body was fabricated by coating the slurry on both surfaces of a negative electrode core body formed of copper foil, and by rolling the coating film with a roller after drying the coating film. In the negative electrode long member, a core body exposed portion having a substantially uniform width was provided at the first end portion of the core body in the width direction and the mixture layer was formed throughout the entire length in the longitudinal direction.

Preparing Nonaqueous Electrolyte Solution

Ethylene carbonate (EC), methyethyl carbonate (MEC), and dimethylcarbonate (DMC) were mixed at a volume ratio of 3:3:4 (under 1 atm at 25° C.). The nonaqueous electrolyte solution was prepared by dissolving $LiPF_6$ in the above mixed solvent at a concentration of 1 mol/L and, further, by adding 0.3 mass % of vinylene carbonate (VC) with respect to the total weight of the nonaqueous electrolyte solution.

Fabrication of Electrode Body

Using a core having a diameter of 36 mmφ, the long members of the positive electrode and the negative electrode described above were wound with the separator interposed in between so that the diameter of the wound body is 60 mmφ and so that the extension portion of the negative electrode that extends out to the winding direction outer side from the winding outer end of the positive electrode is formed. Furthermore, the long members were wound so that the core body exposed portions were positioned in the electrode body on opposite sides in the winding axis direction. In so doing, the long members were fed from opposite directions with respect to the core so that the angle θ illustrated in FIG. 8 was about 180°. Note that pieces of insulating tape were adhered to the winding-start lateral end portion and the winding-end lateral end portion of the positive electrode. Specifically, the configuration was as follows. An insulating tape provided with an adhesion layer on a resin base material was used as the insulating tape. The pieces of insulating tape were adhered to both surfaces of the positive electrode so that two pieces of insulating tape interpose the positive electrode therebetween. The pieces of insulating tape were adhered along the winding inner end or the winding outer end so as to extend in the short direction of the positive electrode. Furthermore, the width of the insulating tape was 19 mm, and the middle of the insulating tape in the width direction was made to overlap the winding inner end or the winding outer end. With the above, half of the area (width 9.5 mm) of the insulating tape in the width direction was adhered on the positive electrode, and half of the area (width 9.5 mm) of the insulating tape in the width direction was protruded outside of the end portion of the positive electrode.

After winding a predetermined length, the long members of the positive electrode, the negative electrode, and the separator were cut and a substantially cylindrical wound body was obtained. By forming the wound body into a flat shape by pressing at a load of about 100 kN, a flat wound electrode body was obtained. The width a of the electrode body was 81.5 mm, and the thickness b thereof was 23.2 mm. Furthermore, the length L of the extension portion of the negative electrode in the winding direction (a distance in the winding direction between the winding direction inner end of the insulating tape and the winding outer end of the negative electrode) was 14.5 mm (see FIG. 9). In the above case, $L/((a-b)\times2+b\pi)$ was 0.077.

Fabrication of Test-Cells (Nonaqueous Electrolyte Secondary Batteries)

Using the electrode body described above, nonaqueous electrolyte secondary batteries 10 described above were fabricated as test-cells.

Checking Whether Short-Circuiting has Occurred and Portion where Micro Short-Circuiting (Conductive Foreign Substance) has Occurred After charging the test-cells to about 10% in charge depth (state-of-charge or SOC), aging at a normal temperature was conducted for two days or more, and an amount of voltage drop (ΔV) was checked. The test-cells in which the ΔV exceeded a predetermined threshold were determined as no good products in which micro short-circuiting may occur. Among the about 150,000 test-cells, there were four no good products. After discharging the no good products to 2.5 V at a constant current of 1C rate, the no good products were disassembled and the electrode bodies were taken out. The electrode bodies were unwound and the separators were visually inspected to specify the locations where the micro short-circuiting had occurred and, at the same time, the presence or absence of the conductive foreign substance was checked. Furthermore, a length X in each negative electrode in the winding direction from the winding outer end of the negative electrode to the portion where the micro short-circuiting had occurred was measured.

A conductive foreign substance that had entered the winding-end lateral end portion of the electrode body was found in all of the four no good products and it was found that the foreign substance had caused micro short-circuiting to occur. The length X that was measured in each of the no good products is shown in Table 1. Using a scanning electron microscope and an energy dispersive X-ray spectroscopy (SEM-EDX), an observation of the surface state and an elementary analysis of the cause of the micro short-circuiting was performed on each of the portions in the separator, the positive electrode, and the negative electrode where the micro short-circuiting had occurred.

TABLE 1

|  | L (mm) | L/((a − b) × 2 + bπ) | X (mm) | X/((a − b) × 2 + bπ) |
|---|---|---|---|---|
| No Good Product 1 | 14.5 | 0.077 | 15 | 0.079 |
| No Good Product 2 | 14.5 | 0.077 | 20 | 0.106 |
| No Good Product 3 | 14.5 | 0.077 | 25 | 0.132 |
| No Good Product 4 | 14.5 | 0.077 | 20 | 0.106 |

Figure 9:
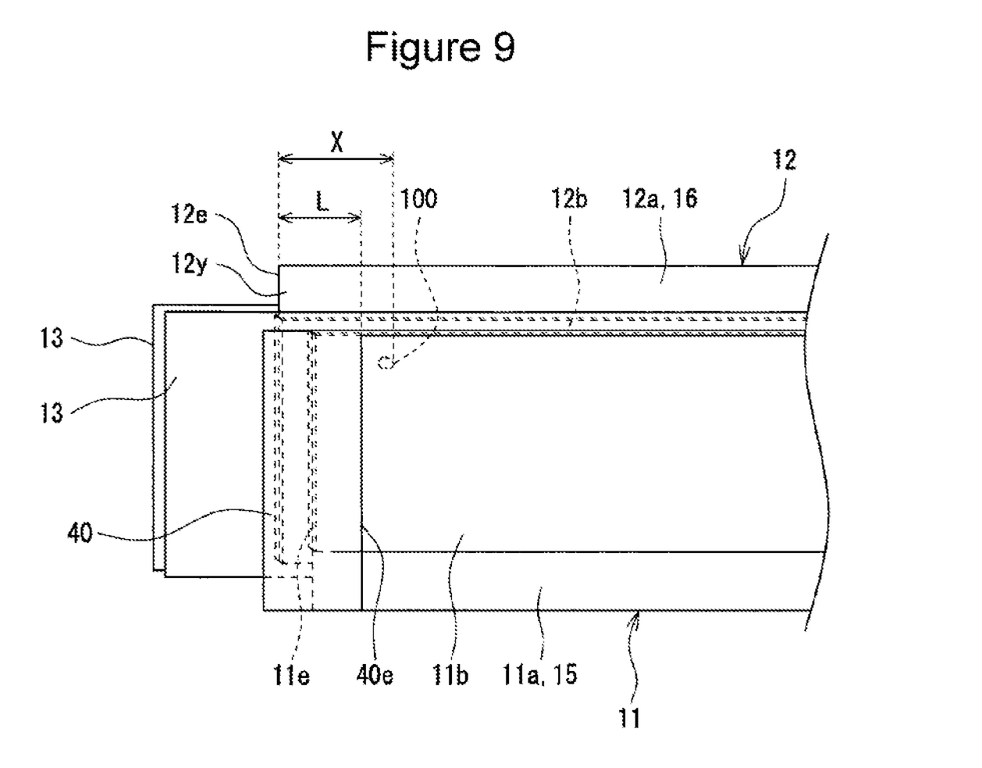
FIG. 9 is a drawing illustrating a reference example of the electrode body.

As shown in Table 1, it can be understood that the conductive foreign substance entered the winding-end lateral end portion of the electrode body in an area 25 mm inward in the winding direction from the winding outer end of the negative electrode. Since the length L (the distance between the winding direction inner end of the insulating tape and the winding outer end of the negative electrode) of the extension portion of the negative electrode in the winding direction was 14.5 mm, as illustrated in FIG. 9, the conductive foreign substance 100 entered a portion where the positive electrode 11 and the negative electrode 12 oppose each other, and the foreign substance tore through the separator 13 causing micro short-circuiting to occur. Note that in the test-cells, since the insulating tape was adhered to the winding-end lateral end portion of the positive electrode, micro short-circuiting caused by the conductive foreign substance was not identified in the area where the insulating tape was arranged.

In a case in which the width a of the electrode body is 81.5 mm and the thickness b thereof is 23.2 mm, 14.5 mm is not enough for the length L of the extension portion of the negative electrode in the winding direction to prevent micro short-circuiting caused by the conductive foreign substance from occurring. The length L needs to be larger than at least 25 mm. If the length L of the extension portion of the negative electrode in the winding direction is larger than 25 mm, the probability of no good products being created can be reduced substantially. Furthermore, as a result of investigations conducted by the inventors, it has been found that when the width a of the electrode body and the thickness b thereof becomes large, the length L of the extension portion of the negative electrode in the winding direction needs to be increased. The occurrence of such micro short-circuiting can be highly suppressed when, regarding the width a and the thickness b of the electrode body and the length L of the extension portion of the negative electrode in the winding direction, the condition $L/((a-b)\times 2+b\pi)>0.135$ is satisfied.

Note that in the embodiment described above, an example has been given of the electrode body 14 in which the core body exposed portion includes a pole plate formed in a belt shape throughout the entire length in the longitudinal direction; however, the condition $L/((a-b)\times 2+b\pi)>0.135$ can be applied to electrode bodies having other configurations. For example, the pole plate constituting the electrode body may include a plurality of leads portions protruding towards one side in the width direction. The lead portions are core body exposed portions connected to a terminal and are formed at uniform intervals in the longitudinal direction of the pole plate. Furthermore, two or more electrode bodies may be housed inside the battery case. In such a case, typically, an electrode body having a small thickness b is used. In a case in which such an electrode body is used, by satisfying the condition $L/((a-b)\times 2+b\pi)>0.135$, the occurrence of micro short-circuiting that may be caused by the conductive foreign substance entering the winding-end lateral end portion of the electrode body can be highly suppressed.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A nonaqueous electrolyte secondary battery comprising:
    a flat electrode body that has a winding structure in which a positive electrode and a negative electrode are wound with a separator interposed in between, wherein flat portions and bend portions are formed in the flat electrode body; and
    a negative electrode mixture layer provided in the negative electrode to a winding outer end thereof, wherein
    the negative electrode includes an extension portion that extends out from a winding outer end of the positive electrode towards a winding direction outer side, and
    a length L of the extension portion in a winding direction satisfies a condition $L/((a-b)\times 2+b\pi)>0.135$, where a is a width of the electrode body and b is a thickness of the electrode body.

2. The nonaqueous electrolyte secondary battery according to claim 1, wherein
    a length of the electrode body in a winding axis direction of the electrode body is 50 to 150 mm, a width of the electrode body is 50 to 150 mm, and a thickness of the electrode body is 10 to 30 mm.

3. A nonaqueous electrolyte secondary battery comprising:
    a flat electrode body that has a winding structure in which a positive electrode and a negative electrode are wound with a separator interposed in between, wherein flat portions and bend portions are formed in the flat electrode body; and
    a negative electrode mixture layer provided in the negative electrode to a winding outer end thereof, wherein
    an insulating layer is provided at a winding-end lateral end portion of the positive electrode,
    the negative electrode includes an extension portion that extends out from a winding direction inner end of the insulating layer towards a winding direction outer side, and a length L of the extension portion in a winding direction satisfies a condition L/((a−b)×2+bπ)>0.135, where a is a width of the electrode body and b is a thickness of the electrode body.

4. The nonaqueous electrolyte secondary battery according to claim 3, wherein
a length of the electrode body in a winding axis direction of the electrode body is 50 to 150 mm, a width of the electrode body is 50 to 150 mm, and a thickness of the electrode body is 10 to 30 mm.

5. The nonaqueous electrolyte secondary battery according to claim 3, wherein
the insulating layer is a piece of insulating tape.

6. A method of manufacturing a nonaqueous electrolyte secondary battery, the nonaqueous electrolyte secondary battery including a flat electrode body that has a winding structure in which a positive electrode and a negative electrode are wound with a separator interposed in between, in which flat portions and bend portions are formed in the flat electrode body, and a negative electrode mixture layer provided in the negative electrode to a winding outer end thereof, the method of manufacturing the nonaqueous electrolyte secondary battery comprising:
fabricating a wound body so that an extension portion that extends from a winding outer end of the positive electrode towards a winding direction outer side is formed in the negative electrode by winding a positive electrode long member and a negative electrode long member around a core with a separator long member interposed in between and by cutting the positive electrode long member and the negative electrode long member after winding a predetermined length; and
forming the extension portion so that a length L of the extension portion in a winding direction satisfies a condition L/((a−b)×2+bπ)>0.135, where a is a width of the electrode body and b is a thickness of the electrode body.

7. The method of manufacturing a nonaqueous electrolyte secondary battery according to claim 6, wherein
the positive electrode long member and the negative electrode long member are fed from directions opposite to each other with respect to the core.

8. A method of manufacturing a nonaqueous electrolyte secondary battery, the nonaqueous electrolyte secondary battery including a flat electrode body that has a winding structure in which a positive electrode and a negative electrode are wound with a separator interposed in between, in which flat portions and bend portions are formed in the flat electrode body, and a negative electrode mixture layer provided in the negative electrode to a winding outer end thereof, the method of manufacturing the nonaqueous electrolyte secondary battery comprising:
fabricating a wound body by winding a positive electrode long member and a negative electrode long member around a core with a separator long member interposed in between and by cutting the positive electrode long member and the negative electrode long member after winding a predetermined length, in which an insulating layer is provided at a winding-end lateral end portion of the positive electrode, and in which the negative electrode includes an extension portion that extends out from a winding direction inner end of the insulating layer towards a winding direction outer side; and
forming the extension portion so that a length L of the extension portion in a winding direction satisfies a condition L/((a−b)×2+bπ)>0.135, where a is a width of the electrode body and b is a thickness of the electrode body.

9. The method of manufacturing a nonaqueous electrolyte secondary battery according to claim 8, wherein
the positive electrode long member and the negative electrode long member are fed from directions opposite to each other with respect to the core.

10. A method of manufacturing a nonaqueous electrolyte secondary battery according to claim 8, wherein
the insulating layer is a piece of insulating tape.

* * * * *